United States Patent [19]

Müller

[11] 3,907,306

[45] Sept. 23, 1975

[54] TONE ARM SUSPENSION FOR A RECORD CHANGER

[75] Inventor: Jürgen Müller, Berlin, Germany

[73] Assignee: U.S. Philips Corporation, New York, N.Y.

[22] Filed: Dec. 19, 1973

[21] Appl. No.: 426,253

[30] Foreign Application Priority Data

Dec. 21, 1972 Germany ............................ 2262661

[52] U.S. Cl. .................... 274/23 R; 274/15; 274/23; 274/10 R; 274/45

[51] Int. Cl.[2] ......................... G11B 3/10; G11B 3/00

[58] Field of Search .......... 274/15, 22, 23, 41.6, 45, 274/10 R

[56] References Cited

UNITED STATES PATENTS

| | | | |
|---|---|---|---|
| 2,588,616 | 3/1952 | Carlson | 274/23 R |
| 3,042,410 | 7/1962 | Brandizzi | 274/10 R |
| 3,083,971 | 4/1963 | Andres | 274/10 R |

*Primary Examiner*—Richard E. Aegerter
*Assistant Examiner*—Larry Jones
*Attorney, Agent, or Firm*—Frank R. Trifari; David R. Treacy

[57] ABSTRACT

A device for adapting the tone arm suspension of a record changer to the varying height of the stack of records placed on the turntable. A tone arm mounting is raised and lowered on an axle by the change mechanism. A tilting plate jams against the axle to hold the mounting at the desired height.

9 Claims, 13 Drawing Figures

TONE ARM SUSPENSION FOR A RECORD CHANGER

Figure 1:
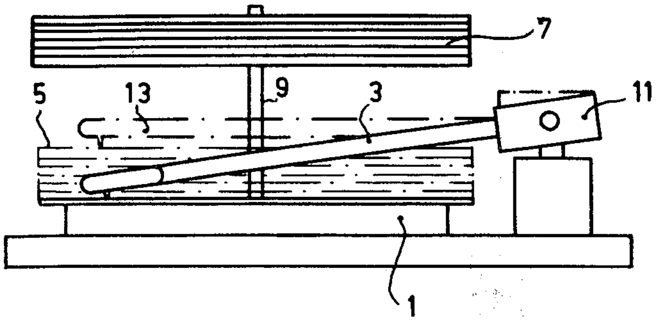
PRIOR ART Fig.1

The invention relates to a record changer provided with a device for adapting the suspension of the tone arm to the varying height of the stack of records placed on the turntable, which device includes a raising device for the tone arm which is controlled by a change mechanism and can be raised and lowered and a jamming member capable of preventing the tone-arm suspension from being lowered.

The optimum angular position of the stylus of the pick-up of a record player relative to the record is a slope of about 15° to the horizontal. The angle is measured with the tone arm in the horizontal position. In a record player playing single records the angle can accurately be adjusted. However, this is not the case with a record changer. The height of a stack increases with the number of records placed on the turntable, and the angle of the tone arm varies with the height of the record stack. At some stack heights the angular position of the stylus is widely different from the optimum slope of about 15°.

In order to eliminate this disadvantage, in a known record changer the pick-up arm suspension is set to the mean height of a stack of records. Thus only the middle record of a stack is played with the stylus at the correct angle, but the bottom and top records are played at unfavourable angles.

It is also known to set the tone arm suspension in steps, for which purpose the tone arm rest is provided with a straight toothed rack along which the tone arm suspension may be raised or lowered. However, the thickness of a single record is small and in particular may differ from record to record. Hence when using a straight toothed rack the stylus slope varies with respect to the optimum slope (German Patent Specification No. 891,628, Swiss Patent Specification 244,381).

It is also known to vary the slope of a stylus by changing of the stylus suspension. For record changers, in which this alteration would have to be automatic, however, this construction is unsuitable (German Patent Application 1,956,736 laid open to public inspection).

It is an object of the present invention to provide a device in a record changer for adapting the height of the tone arm suspension which is continuous and accurately adapts itself to the respective record thickness.

For this purpose, according to the invention a record changer comprises a tilting latch plate for preventing downward movement, which jams against the axle on which the tone arm is mounted and is tiltable on this axle.

The use of a tilting, jamming plate results in a fully adaptable adjustment of the height of the arm which adapts itself to the particulars of the record, the stack of records and the record changer. Thus the optimum angle for each record can always be used.

In an embodiment of the invention the suspension together with the tone arm can be raised by the change mechanism during each change cycle so that at each subsequent downward movement the tilting plate is tilted at a height which matches the instantaneous height of the record stack.

According to the invention the tilting plate preferably is an apertured plate, the mounting axle passing through the aperture with a certain amount of clearance. The interaction of the mounting axle and the plate permits operation within very close tolerances.

In a suitable embodiment of the invention the tone arm suspension comprises a bracket which supports the tone arm and a sleeve which hingedly supports the bracket and is slidably upwards and downwards along the supporting axle, a pawl which bears the tilting plate being hinged to the bracket. The pawl mainly serves to restore the plate to the untilted position during the raising and lowering movements until the plate is to be tilted again.

In a further embodiment of the invention the axle about which the bracket is pivotably mounted on the sleeve and the axle about which the pawl is pivotably mounted on the sleeve are spaced from one another in the direction of length of the tone arm. This ensures that the tilting plate can always be pivoted from the tilted position by the pawl.

In a further embodiment, during the raising of the tone arm suspension the plate can be pivoted from the tilted position to a sliding position by means of the plate-raising pawl, in which latter position the plate rests on the pawl, whilst when the tone arm suspension is raised further the pawl and the plate strike a stop which pivots them into a position in which the pawl strikes a locking device which retains them in this position, and during the subsequent lowering movement of the tone arm suspension the pawl is disengaged from the locking device and releases the tilting plate as soon as the tone-arm stylus lands on the next record and the raising device continues its downward movement. The pawl then pushes the plate into a tilted position in which it pivots about a setting stop. Thus the tone arm suspension is locked against further downward movement.

It is of importance that the pawl should not itself perform any movement, to ensure that it engages the locking device without friction but also can disengage itself from this device at the correct instant. For this reason the inertia forces of the pawl arms on either side of the axis of rotation are balanced in a horizontal position.

The locking device may take various forms. One of these forms consists of a magnet mounted on the tone-arm bracket. In another form the pawl is clamped to the bracket or is pressed against it by friction, with the same result.

Further it is of importance that the holding force which acts on the pawl remains limited to prevent the movement of the tone arm from being impeded by this force. For this reason the force of the magnet or the clamping device which acts on one lever arm of the pawl is opposed by a spring force. The opposing spring force may be exerted by a compression spring which acts on the other lever arm of the pawl.

Figure 2:
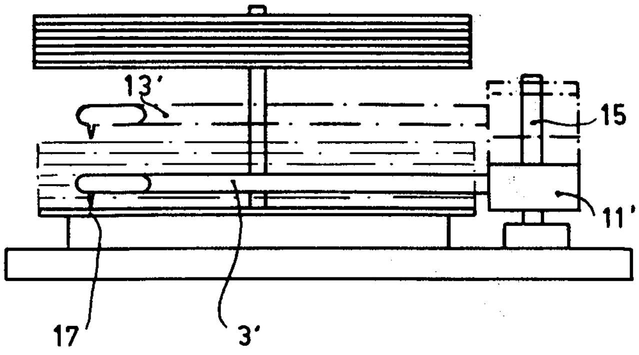
Figures 3, 4A, 4B, 5, 6:
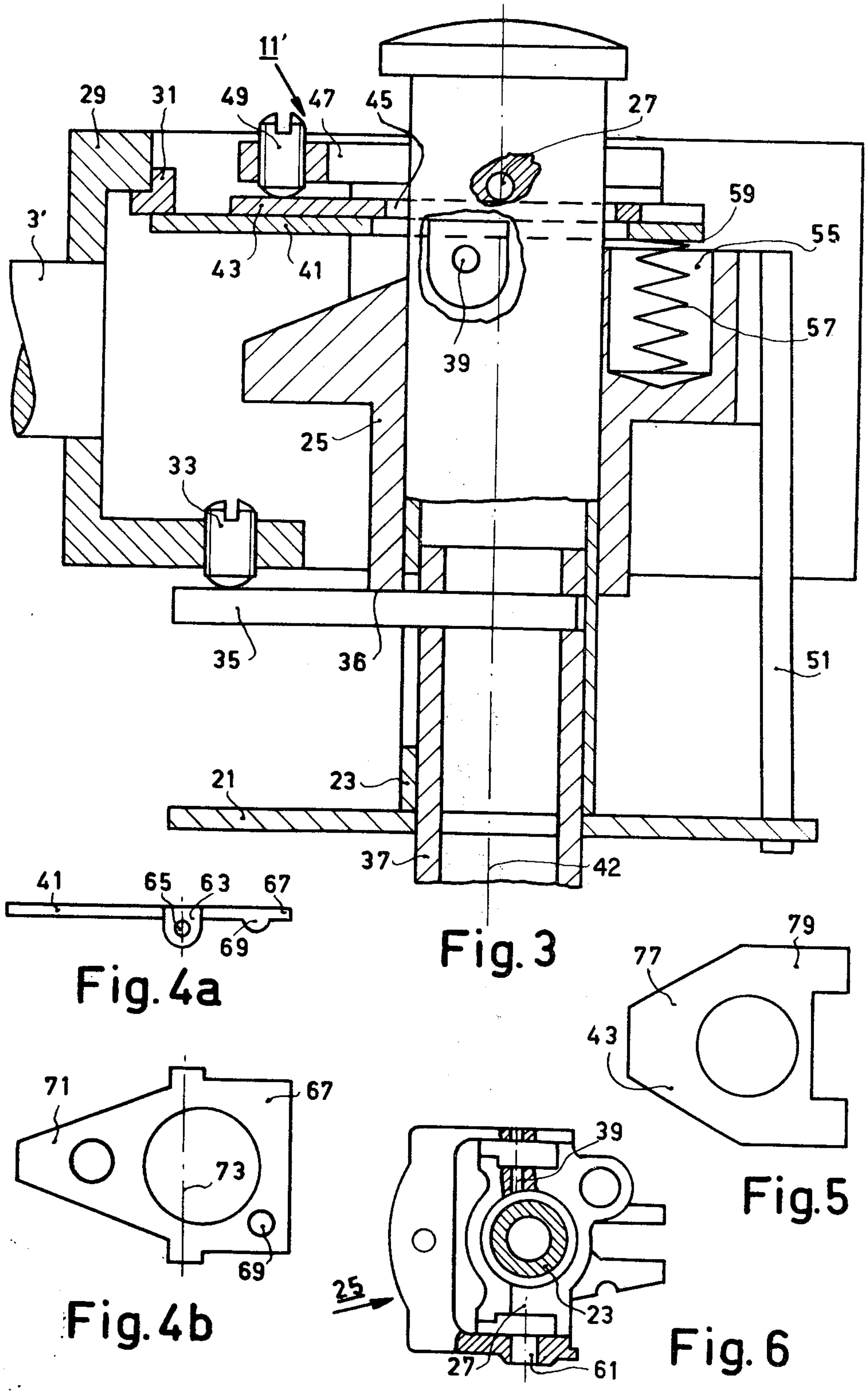

Embodiments of the invention will now be described by way of example with reference to the accompanying diagrammatic drawings, in which:

FIG. 1 shows schematically a record changer provided with a tone-arm suspension which cannot be adjusted in height, FIG. 2 shows the even height adjustment by means of a device according to the invention, FIG. 3 is a sectional view of the height-adjusting device according to the invention, FIG. 4*a* is a side elevation of a switching pawl used in the device, FIG. 4*b* is a plan view of the switching pawl shown in FIG. 4*a*, FIG. 5 shows a tiltable apertured plate, FIG. 6 shows a supporting sleeve capable of vertical sliding movement on the tone-arm supporting axle, and FIGS. 7 to 12 illustrate functions of the height-adjusting device according to the invention.

Referring now to FIG. 1, a record to be played is in place on a turntable 1 of a record changer. A tone arm 3 rests on the record. The height of the stack of records which may lie on the turntable is indicated by a broken line 5. Records 7 to be dropped to the turntable are supported by a change spindle 9. The suspension 11 of the tone arm of this record changer is set to a mean height so that the angle of the tone arm 3 in the playing position varies between a lowermost position shown in full line and an upper position 13 shown by broken lines.

Because owing to these play-angle differences operation is unsatisfactory, a device according to the invention shown schematically in FIG. 2 is used in which the suspension 11′ of the tone arm 3′ can be raised and lowered along a tone arm supporting axle 15. Thus the play angle of the tone arm 3′ always is the same. FIG. 2 shows that in this arrangement the tone arm 3′ shown in full lines scans the record 17 at an angle equal to that at which the tone arm 13′ shown by broken lines in a raised position scans the uppermost record of the stack.

FIG. 3 is a sectional view showing in detail the construction of the suspension 11′ of the tone arm. An axle 23 supporting a sleeve 25 is mounted on a rotary tray 21 of a record changer. The sleeve 25 by means of an axle 27 carries a bracket 29 supporting the tone arm 3′ which is rigidly secured to it. A magnet 31 the function of which will be described hereinafter is secured to the bracket 29. The bracket 29 is provided with a set screw 33 which can engage an arm 35 of a tone-arm lift 37. The arm 35 also co-operates with the lower end 36 of the sleeve 25. A switching pawl 41 is mounted on the sleeve so as to be pivotable about a horizontally extending axle 39. The axles 39 and 27 are arranged parallel to one another but spaced from one another in the direction of length of the tone arm. The axle 39 is located nearer to the tone arm and the axle 27 is preferably intersected by the axis 42′ of the supporting axle 23.

The switching pawl 41, which is a two-armed lever, supports a tilting plate 43. The axle 23 passes through the switch pawl 41 and through the tilting plate 43. The switching pawl surrounds the axle 23 with a large amount of clearance, but the clearance between the outer diameter of the sleeve 23 and the inner diameter of an aperture 45 formed in the plate 43 is small. A set screw 49, the function of which will be described hereinafter, is mounted in a projecting part 47 of the sleeve 25. The sleeve 25 is further provided with a pin 51 which engages in the rotary tray 21 of the tone-arm suspension. The sleeve 25 is formed with a recess 55 which contains a spring 57 which presses against the lower surface 59 of the switching pawl.

FIG. 6 is a plan view of the sleeve 25. It shows clearly how the sleeve 25 encloses the axle 23 and how journal bearings 61 for the axle 27 are shifted with respect to the axle 39. The sleeve 25 is capable of rotation in a horizontal plane and the bracket 29 is capable of pivoting about the axle 27 in a horizontal plane on the sleeve 25. This also applies to the switching pawl 41.

The said switching pawl, which is shown in FIGS. 4*a* and 4*b*, preferably is made of magnetic sheet material. Lugs 63 are bent from the plate and are formed with apertures 65 through which the axle 39 can pass. The right-hand lever arm 67 of the switching pawl is formed with a protrusion 69 which engages in the spring 57. The left-hand lever arm 71 tapers from an axis 73. The shape of the lever arm 71 is not of importance. The only important requirement is that the masses of the lever arms 67 and 71 are balanced so that the switching pawl when free to pivot about the axis 73 will assume and maintains a horizontal position.

FIG. 5 is a plan view of the tilting plate 43. In certain positions, for example the position shown in FIG. 3, the plate 43 lies on and in contact with the switching pawl 41. The plate 43 is capable of fixing the height of the entire tone arm suspension 11′ on the axle 15 by pivoting on the axle 23.

Figure 7:
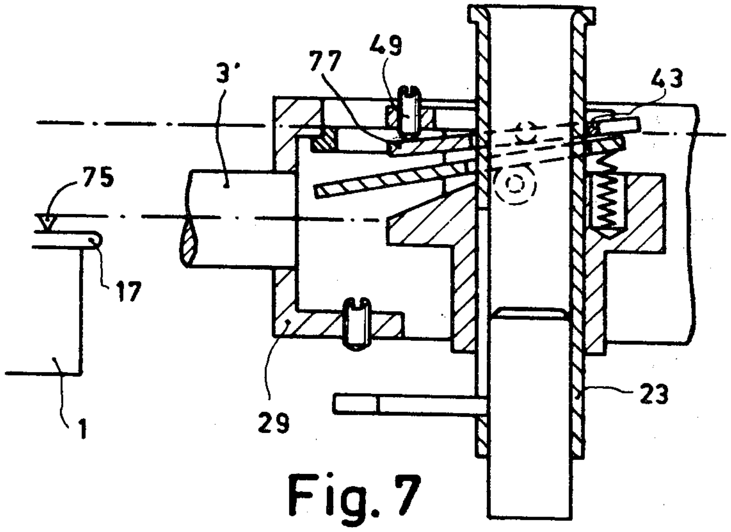
Figure 8:
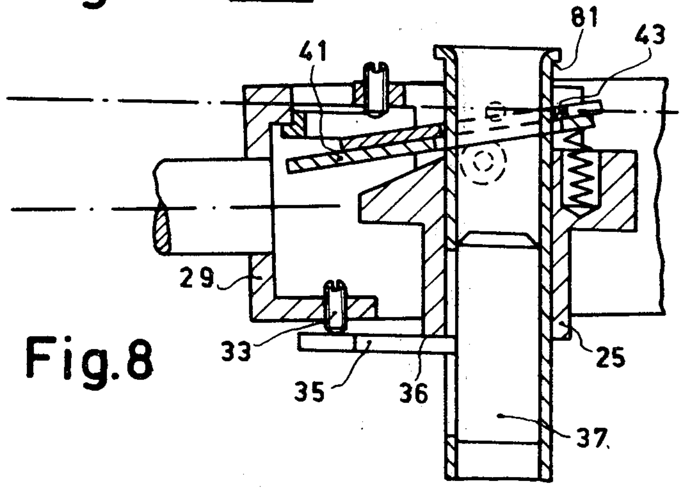
Figure 9:
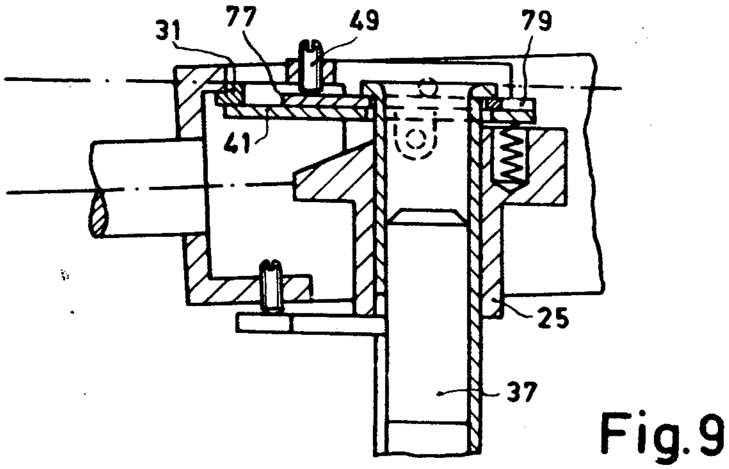

FIG. 7 shows the suspension of the tone arm from the axle 23 during operation of the record changer. A stylus 75 rests on the record 17. The tone arm 3′ is in a substantially horizontal position; this also applies to the bracket 29. The tilting plate 43 is tilted about the axle 23 by the pressure of the set screw 49 which acts on its left-hand end 77. Consequently, the entire load of the tone arm suspension is supported, via the set screw 49 and the latch plate 43, by the axle 23 (FIG. 8). When the record 17 has been played and a change cycle is to be effected, the tone-arm lift 37 raises the sleeve 25 in that the arm 35 strikes the lower surface 36 of the sleeve 25. On further upward movement of the lift 37 the bracket 29 is slightly tilted forward until the set screw 33 engages the arm 35. Owing to the sleeve 25 being raised the pawl 41 raises the tilting plate 43 from below into a horizontal position.

Figure 10:
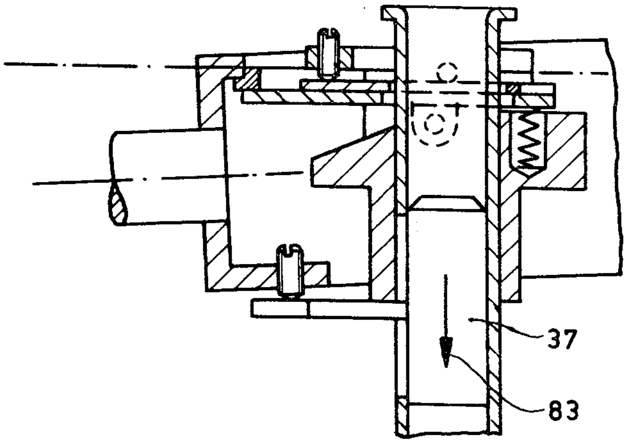
Figure 11:
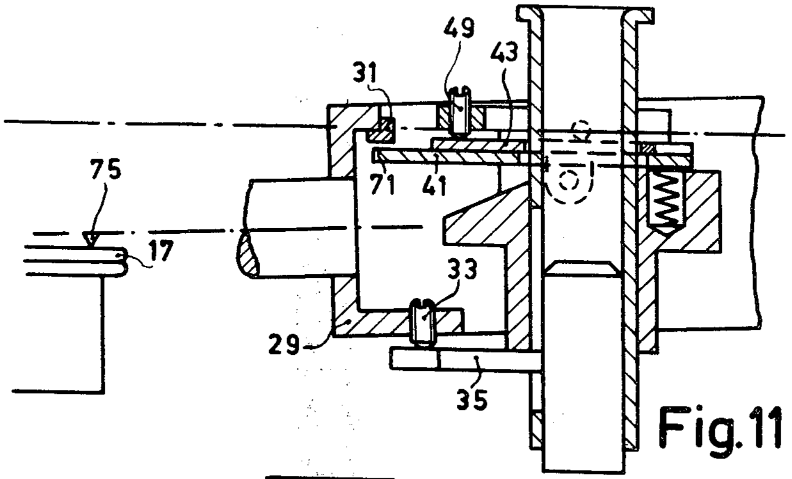
Figure 12:
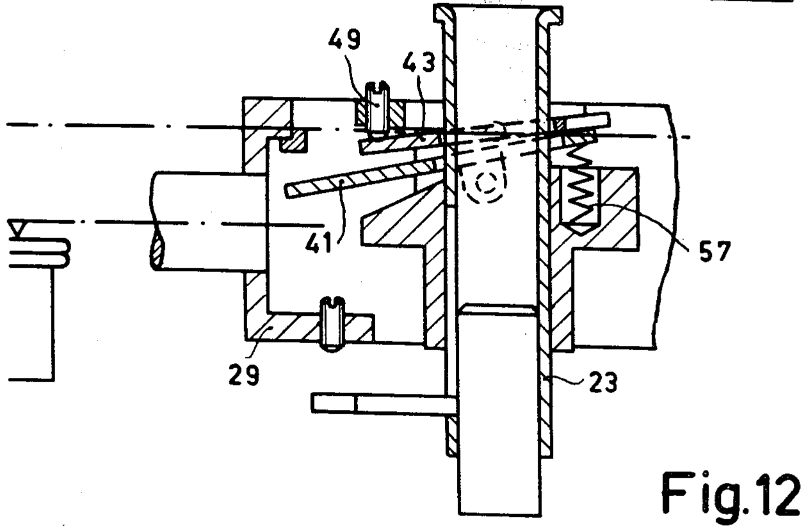

The lift 37 raises the sleeve 25 until the right-hand end 79 of the latch plate 43 strikes a projection 81 (FIG. 8) on the axle 23. As FIG. 8 shows, this results in the tilting plate 43 and the pawl 41 being pivoted into a horizontal position. The left-hand end 77 of the plate again engages the set screw 49, and the front end of the lever arm 71 of the pawl 41 engages the magnet 31. This magnet retains the pawl 41 in the horizontal position even when the lift 37 moves down again in the direction of an arrow 83, as is shown in FIG. 10. The downward movement of the stylus 75 ceases when it has landed on the next record 17′. At this instant the bracket 29 pivots to a substantially horizontal position, the set screw 33 being disengaged from the arm 35. The switching pawl cannot follow the pivoting movement of the bracket 29, because the tilting plate 43 resting on it engages the set screw 49. This causes the left hand lever arm 71 of the pawl 41 to become disengaged from the magnet 31. As FIG. 12 shows, the spring 37 causes the further disengagement of the pawl 41 from the magnet to be accelerated. After the pawl 41 has become disengaged from the magnet it presses the right-hand end of the tilting plate 43 upwards into the tilted position. The left-hand end of the latch plate pivots about the set screw 49. The set screw 49 engaging the plate increases the clamping effect by the weight of the tone arm. Via the set screw 49 the load of the bracket 29 rests on the left-hand end 77 of the tilting plate 43. Thus a new and matching height adjustment of the tone arm suspension has been achieved.

What is claimed is:

1. A tone arm and suspension device for a record changer, comprising a tone arm, an axle rotatable about its longitudinal axis, means slidable along said axle for mounting said tone arm for pivotal movement about a first axis perpendicular to said axle axis, a tone arm lifting means for lifting said mounting means and tone arm upward during a change cycle and for subsequently lowering said mounting means and tone arm, and means for sensing contact of said tone arm with a record and engaging said mounting means to said axle upon such contact, such that the height position of the mounting means adapts to a varying height of a stack of records, wherein said means for sensing and engaging comprise a tilting member which engages said axle by tilting with respect to said axle to jam against it so as to prevent movement of said mounting means downward, the jamming engagement being released by rotating said tilting member toward an angular position perpendicular to said axle axis during upward movement of said tone arm lifting means, and means for retaining said tilting member in position with respect to said axle for jamming engagement and release.

2. A device as claimed in claim 1 wherein said tilting member comprises an apertured plate, said axle passing through the aperture, said aperture having a size to provide a small clearance when the member is rotated toward a perpendicular position with respect to said axle axis.

3. A device as claimed in claim 2 wherein said tilting member is retained within said mounting means so as to be freely slidable over the distance of said small clearance.

4. A device as claimed in claim 1 wherein said mounting means comprises a sleeve slidable along said axle and a switching member pivotally mounted on said sleeve about a second axis perpendicular to said axle axis, said switching member engaging saaid tilting member so as to rotate about said second axis and so disposed that during at least a portion of the tone arm lifting portion of the change cycle the switching member engages the tilting member and rotates about said second axis to a first position so as to rotate said tilting member toward a perpendicular position with respect to the axle axis to release said jamming engagement.

5. A device as claimed in claim 4 wherein said second axis is spaced from said first axis along the longitudinal direction of the tone arm.

6. A device as claimed in claim 5 wherein said tilting member comprises an apertured plate, said axle passing through the aperture, said aperture having a size to provide a small clearance when the member is rotated toward said perpendicular position, said tilting member being retained within said mounting means so as to be freely slidable over the distance of said small clearance, said tone arm comprising a locking device for holding said switching member in said first position, said device further comprising a tone arm positioning means for holding the tone arm in a second angular position with respect to said mounting means during at least said lifting portion of the change cycle, and means for disengaging said switching member from said locking device upon rotation of said tone arm about said first axis when said tone arm lands on a record.

7. A device as claimed in claim 6 wherein said locking device comprises a magnet, said switching member comprising a magnetic material.

8. A device as claimed in claim 6 wherein said means for disengaging comprises a stop means on the sleeve for engaging the tilting member to hold the tilting member in jamming engagement with the axle when a record is being played.

9. A device as claimed in claim 6 wherein said switching member comprises arm portions extending in opposite directions from the second axis so arranged that the inertia forces to either side of the second axis are equal.

* * * * *